(12) United States Patent
Woolcock et al.

(10) Patent No.: US 11,947,405 B2
(45) Date of Patent: *Apr. 2, 2024

(54) SYSTEMS AND METHODS FOR MITIGATING POWER FAILOVER

(71) Applicant: Microsoft Technology Licensing, LLC, Redmond, WA (US)

(72) Inventors: Kyle Edward Woolcock, Redmond, WA (US); Alok Gautam Kumbhare, Redmond, WA (US); Nithish Mahalingam, Sammamish, WA (US); Brijesh Warrier, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,910

(22) Filed: Sep. 30, 2022

(65) Prior Publication Data
US 2023/0024444 A1 Jan. 26, 2023

Related U.S. Application Data

(63) Continuation of application No. 17/074,979, filed on Oct. 20, 2020, now Pat. No. 11,460,910.

(51) Int. Cl.
*G06F 1/00* (2006.01)
*G06F 1/28* (2006.01)
*G06F 1/30* (2006.01)
*G06F 1/3296* (2019.01)

(52) U.S. Cl.
CPC .............. *G06F 1/3296* (2013.01); *G06F 1/28* (2013.01); *G06F 1/30* (2013.01)

(58) Field of Classification Search
CPC . G06F 1/28; G06F 1/3296; G06F 1/30; G06F 1/3206; G06F 1/3287; G06F 1/263; Y02D 10/00
See application file for complete search history.

(56) References Cited

U.S. PATENT DOCUMENTS

| | | | |
|---|---|---|---|
| 2009/0282274 A1* | 11/2009 | Langgood | G06F 1/3203 713/320 |
| 2011/0173465 A1* | 7/2011 | Akers | G06F 1/329 718/1 |
| 2012/0054512 A1* | 3/2012 | Archibald | G06F 1/26 713/320 |
| 2019/0332164 A1* | 10/2019 | Sinha | G06F 1/3225 |
| 2020/0142465 A1* | 5/2020 | Jenne | G06F 1/3206 |

* cited by examiner

*Primary Examiner* — Nitin C Patel
(74) *Attorney, Agent, or Firm* — Ray Quinney & Nebeker; James Bullough

(57) ABSTRACT

A rack in a datacenter is powered by a first power feed and a second power feed. The rack supports a plurality of servers which have a maximum combined power consumption which is greater than a maximum supplied power from either the first power feed or the second power feed. When power is lost from one of the power feeds, a rack manager reduces the total power consumption of the plurality of servers by throttling at least one of the servers and/or shutting off at least one of the plurality of servers.

20 Claims, 10 Drawing Sheets

SYSTEMS AND METHODS FOR MITIGATING POWER FAILOVER

CROSS-REFERENCE TO RELATED APPLICATIONS

This Application is a Continuation of U.S. Pat. No. 11,460,910 issued on Oct. 4, 2022, the entirety of which is incorporated herein by reference.

BACKGROUND

A datacenter is a physical facility that is used to house computing systems and associated components. A datacenter typically includes a large number of computing systems (e.g., servers), which may be stacked in racks that are placed in rows.

In a typical configuration, in order to facilitate a high degree of availability, a rack may have two independent power feeds. In this manner, if one power feed is lost, the second power feed may supply power to the rack and its associated servers. The servers in a rack may be designed such that their combined power consumption is less than the maximum amount of power that either power feed is capable of supplying individually. Thus, when one of the power feeds becomes unavailable, there is a limited impact on functionality of the servers. To prevent damage from overdrawing power through the power feeds, a circuit breaker may be installed in the rack to interrupt power to one or both power feeds if the power draw through one or both individual power feeds exceeds the circuit breaker's threshold.

In a large datacenter, different racks of servers may be used for different applications. These different applications may run at different utilization levels and therefore consume different amounts of power. For instance, one type of application (e.g., cloud computing operations) may, on average, consume less power than another type of application (e.g., internet search operations). This can result in a different number of servers in racks deployed to the datacenter for the different applications, which can be costly in terms of supply chain overhead. This approach requires warehousing as well as configurations, onboarding, and qualification of two different racks. Benefits can be realized by a unified server and rack architecture that would allow fungibility between different applications that have different utilization levels and consume different amounts of power.

SUMMARY

In accordance with one aspect of the present disclosure, a rack in a datacenter includes a first power feed that provides a first maximum supplied power and a second power feed that provides a second maximum supplied power. A plurality of servers have a combined power consumption that exceeds at least one of the first maximum supplied power or the second maximum supplied power. A rack manager is configured to reduce the combined power consumption to below the second maximum supplied power when the first power feed is not supplying power to the rack.

In some embodiments, the rack manager can reduce the combined power consumption by throttling at least one server of the plurality of servers. As another example, the rack manager can reduce the combined power consumption by shutting off at least one server of the plurality of servers. The combined power consumption of the plurality of servers can be a maximum power consumption of the plurality of servers.

The rack in the datacenter can include a power meter that monitors a first power level of the first power feed and a second power level of the second power feed. A circuit breaker can have a threshold and may interrupt power at the first power feed and the second power feed when the combined power consumption is greater than the threshold. When the first power feed is not supplying power to the rack, the rack manager is in communication with the power meter and the circuit breaker and can reduce the combined power consumption to below the threshold before the circuit breaker trips.

In some embodiments, the server that is throttled and/or shut off can be pre-identified. The pre-identified server can receive power only from the first power feed.

The rack manager can reduce the combined power consumption during a trip cycle of the breaker. The combined power consumption can be less than an instantaneous threshold of the circuit breaker. The at least one server may be throttled based on a pre-defined throttling limit.

The threshold of the circuit breaker can be a dual-feed threshold, and the combined power consumption can be reduced to below the dual-feed threshold. The dual-feed threshold can be less than an instantaneous-use threshold of the circuit-breaker.

In accordance with another aspect of the present disclosure, a rack in a datacenter can include a first power feed providing a first maximum supplied power and a second power feed providing a second maximum supplied power. The rack can also include a plurality of servers. A combined power consumption of the plurality of servers exceeds at least one of the first maximum supplied power or the second maximum supplied power. The rack also includes a power meter configured to monitor a first power level at the first power feed and a second power level at the second power feed. The rack also includes a circuit breaker having a threshold. The circuit breaker is configured to interrupt power at the first power feed and the second power feed when the combined power consumption is greater than the threshold. The rack also includes a rack manager in communication with the power meter and the circuit breaker. The rack manager is configured so that, when the first power feed is not supplying power to the rack, the rack manager reduces the combined power consumption to below the threshold before the circuit breaker interrupts the power.

In some embodiments, the rack manager can reduce the second power level by throttling at least one server of the plurality of servers. The at least one server can be pre-identified.

In some embodiments, the rack manager can reduce the second power level by shutting off at least one server of the plurality of servers. The at least one server can be pre-identified. The pre-identified at least one server can receive power only from the first power feed.

The rack manager can reduce the combined power consumption during a trip cycle of the circuit breaker. The combined power consumption can be less than an instantaneous threshold of the circuit breaker.

In accordance with another aspect of the present disclosure, a method for mitigating power overdraft during a loss of power from a power feed powering a rack of servers is disclosed. The method includes receiving power from a first power feed and a second power feed at the rack. The first power feed has a first maximum supplied power and the second power feed has a second maximum supplied power. The method also includes operating a plurality of servers in the rack. The plurality of servers has a maximum combined power consumption that is greater than at least one of the first maximum supplied power or the second maximum supplied power. The method also includes determining that a combined power consumption of the plurality of servers is greater than a threshold. Based on the combined power consumption, the combined power consumption of the plurality of servers is reduced to below the threshold.

In some embodiments, reducing the combined power consumption can include throttling at least one server of the plurality of servers. Throttling the at least one server can include throttling the at least one server based on a predefined throttling limit.

In some embodiments, reducing the combined power consumption can include powering off at least one server of the plurality of servers. Alternatively, reducing the combined power consumption includes throttling a first server of the plurality of servers and powering off a second server of the plurality of servers.

In some embodiments, the threshold can be the second maximum supplied power, and the method can additionally include identifying that a supplied power from the first power feed is interrupted and, after the supplied power from the first power feed is interrupted, beginning a trip cycle of a circuit breaker. Reducing the combined power consumption can occur before an end of the trip cycle.

As another example, the threshold can be a dual-feed threshold, and reducing the combined power consumption of the plurality of servers can include reducing the combined power consumption to below the dual-feed threshold while receiving power from both the first power feed and the second power feed.

The dual-feed threshold can be lower than an instantaneous use threshold, and the method can additionally include losing power from the first power feed. Reducing the combined power consumption of the plurality of servers can include reducing the combined power consumption before a circuit breaker trips.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
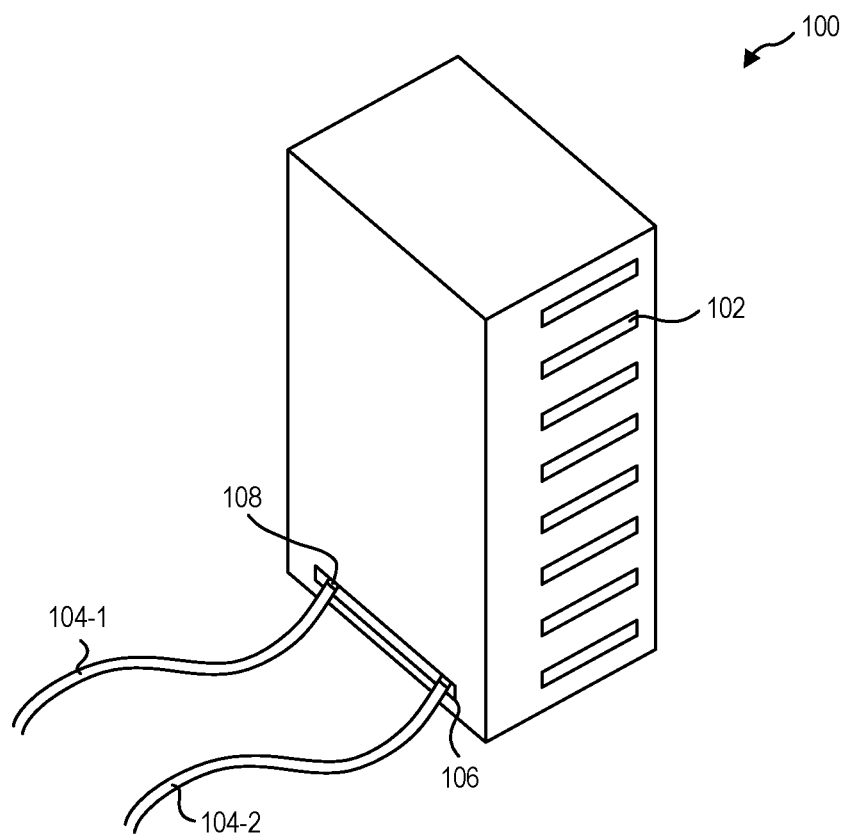
FIG. 1 is a representation of a rack that supports a plurality of servers.

The present disclosure is generally related to a server and rack architecture that would allow fungibility between different configurations that have different utilization levels and consume different amounts of power. To enable this kind of fungible server and rack architecture, techniques for mitigating power failure of a single power feed are disclosed herein. In accordance with the techniques disclosed herein, the servers in a rack may have a combined power consumption that is greater than the maximum supplied power of a single power feed into the rack. A power failover event can occur when the first feed fails (e.g., if the first feed stops supplying power to the rack) and the second feed takes over as the primary power source. In this situation, the combined power consumption of the servers may be greater than the maximum supplied power of the second power feed. Without mitigation, this could result in a circuit breaker tripping and cutting power from the second feed to the rack, thereby stopping all operations on the rack. To mitigate power overdraft during a power failover event, a rack manager on the rack may reduce the power drawn by the servers of the rack. The rack manager may reduce the power drawn by either capping the amount of power drawn by one or more servers in the rack (e.g., throttling), by cutting power to one or more servers in the rack, or a combination of both of these mitigation techniques. This may reduce the power drawn by the servers in the rack, thereby preventing the circuit breaker from cutting power at the second power feed.

In accordance with embodiments of the present disclosure, a plurality of servers are installed in a rack. A server is a computing device that includes one or more processors. The servers in a rack can be configured for various applications (e.g., cloud computing, internet searching, database processing, artificial intelligence). The servers in a particular rack may be reconfigurable between different applications.

An individual server may have a processing specification based on the utilization of the server for its particular configuration. For example, a server configured for a first application (e.g., cloud computing operations) may, for the majority of the time, utilize a certain percentage (e.g., 50%) of the processing capacity of the server. On the other hand, a server that includes identical hardware but that is configured for another application (e.g., internet search operations) may, for the majority of the time, utilize a higher percentage (e.g., 70%) of the processing capacity of the server. Stated another way, a first server configured for a first application may have a first processing specification (e.g., a processing specification of 50%), while a second server that includes the same hardware as the first server but that is configured for a second application may have a second processing specification (e.g., a processing specification of 70%). Of course, the specific percentages referenced herein are provided for purposes of example only and should not be interpreted as limiting the scope of the present disclosure.

The power level associated with the processing specification may be referred to herein as the specification power level. The specification power level may be the maximum power level anticipated to be experienced by the server in the associated configuration. The specification power level for a server configured with a certain processing specification (e.g., 50%) may be lower than the specification power level for the same server configured with a higher processing specification (e.g., 70%).

In accordance with the techniques disclosed herein, the server may sometimes exceed the specification power level. However, the mitigation policies and power reduction mechanisms discussed herein may be applied to a rack having one or more servers that exceed the specification power level.

Servers within the same rack may share resources including power management systems and/or rack management systems. The rack may include redundant power feeds that supply power to the servers in the rack. The rack may support multiple servers of the same configuration, or may support servers set up with different configurations. The servers in the rack have a combined power consumption, which may be the sum of the power consumption of each server in the rack.

In accordance with embodiments of the present disclosure, a power feed provides electrical power to the rack from a power source. Typically, a rack may have two power feeds, although additional power feeds may be possible. Each power feed may independently supply power to the rack, and the rack may utilize power from both power feeds. Each power feed may have a maximum supplied power, which is the maximum amount of power that may safely be drawn through the power feed. In some embodiments, a particular amount of power can be safely drawn through a power feed if it does not damage the power feed, other elements of the electrical infrastructure of a datacenter, or the servers (and other components) in the rack. Stated another way, the maximum supplied power may be identified as the amount of load the power feed is capable of handling.

In some embodiments, a power feed can safely provide any amount of power that does not exceed the power feed's power rating. The components in the electrical infrastructure of a datacenter typically have a power rating. Power ratings are usually set as guidelines by manufacturers. In components that primarily convert between different forms of electrical power (e.g., transformers) or transport power from one location to another (e.g., power distribution units (PDUs)), the power rating associated with a particular component typically indicates an amount of power that can be permitted to flow through that component without damaging the component.

Power ratings generally include a certain safety margin. Exceeding the power rating of a component by a small amount (within the safety margin set by the manufacturer) for a very short period of time is generally not harmful. However, exceeding the power rating of a component by more than the safety margin may damage the component by causing its operating temperature to exceed safe levels. In some embodiments, a power feed can safely provide any amount of power that does not exceed the power feed's power rating by more than the safety margin. As another example, a power feed can safely provide any amount of power that does not exceed the power feed's power rating by more than the safety margin for longer than a defined time period.

In some embodiments, the maximum supplied power may be the maximum amount of power that is available to the servers in the rack. Under some circumstances, the maximum available power may be de-rated from the absolute maximum power to protect against damage due to accidental or fleeting overdrafts of power. In some embodiments, the maximum available power may be set by the rack manager. Alternatively, the maximum available power may be set by the circuit breaker. The maximum available power may represent an operational threshold or limit to the power available to be drawn by the servers.

In some embodiments, a rack including servers that are configured for an application having a certain processing specification (e.g., a processing specification of 50%) may have a maximum combined power consumption that is the same as or less than the maximum available power of a single power feed. Thus, if one of the power feeds loses power, the entire rack may be powered without change from the remaining power feed. The techniques disclosed herein enable the servers in the rack to be reconfigured for a different application having an increased processing specification (e.g., a processing specification of 70%). Reconfiguring the servers in this way increases the maximum combined power usage. Therefore, if one of the power feeds loses power, the total power consumption of the servers in the rack could exceed the maximum amount of power that the remaining power feed is capable of supplying. Without the techniques disclosed herein, the loss of a power feed could cause damage to the servers in the rack and/or to components in the datacenter's power infrastructure. To enable the servers in the rack to be reconfigured for applications corresponding to higher power usage, the present disclosure proposes techniques for reducing the power consumption of one or more servers when a power feed loses power. Thus, the techniques disclosed herein may increase the versatility of rack setups. For example, a rack configured for a particular application having a certain processing specification can be reconfigured to a different application having a higher processing specification. Because of the power failover mitigation procedures discussed herein, the reconfigured rack of servers can effectively handle the loss of one of the power feeds.

The ability to reconfigure entire racks of servers to configurations with different processing specifications may help to reduce overall equipment costs (e.g., capital expenditures). This may further help to reduce warehousing costs and complications by being able to reduce the number of different rack/server combinations.

A rack may include a power management distribution unit (PMDU). Each power feed may be plugged into PMDU. Each server may be plugged into the PMDU in two or more different locations to receive power from both the first power feed and the second power feed. For instance, a server powered by three-phase power may be plugged into a server in six locations, two for each phase. In this manner, if power is lost to one of the power feeds, each server may still receive power from the other power feed without any interruption, or with minimal interruption, to the supplied power.

A rack may include one or more circuit breakers connected to the power feeds. For example, each power feed may have a dedicated circuit breaker (e.g., a first power feed may have a first circuit breaker and a second power feed may have a second circuit breaker). The circuit breakers may have an operational threshold, above which the circuit breaker will "trip," or interrupt the power connection between the power feed and the rack.

In some embodiments, the circuit breaker follows a trip curve or a time current curve while tripping. The circuit breaker may have a continuous use threshold and an instantaneous use threshold. If the power feed draws more power than the instantaneous use threshold, the circuit breaker will trip effectively immediately (e.g., without time for a rack manager to reduce the power consumption of one or more servers). The continuous use threshold may be de-rated from the instantaneous use threshold. For example, the continuous use threshold may be a certain percentage less than the instantaneous use threshold. If the power feed draws more power than the continuous use threshold, the circuit breaker may begin a trip cycle. The trip cycle may occur over a period of time (e.g., several seconds up to several minutes), and the circuit breaker may trip based on a variety of factors, including power drawn over the continuous use threshold over time, temperature, operational capacities, other factors, and combinations thereof.

A rack manager may be connected to the PMDU and the two power feeds. In accordance with embodiments of the present disclosure, the rack manager may be a controller that controls one or more aspects of the rack. For example, the rack manager may receive measurements from one or more sensors that measure the power input from the power feeds. The rack manager may also be capable of determining various characteristics of the servers in the rack. For example, the rack manager may be capable of determining the amount of power drawn from individual servers and/or the cooling system status. The rack manager may be coupled to circuit breakers for the power feeds and/or temperature sensors located throughout the rack.

In some embodiments, the rack manager may be in operational control of one or more aspects of the rack. For example, the rack manager may be able to control the power supply to each individual server. In this manner, the rack manager may shut off individual servers to reduce the combined power consumption by the servers in the rack. In some examples, the rack manager may be in communication with the servers in the rack. The rack manager may send instructions to one or more servers to reduce the power usage of the server(s), such as by limiting the number of computations the server(s) may perform (e.g., throttling the server(s)). In some embodiments, the rack manager may have control to both shut off some servers and throttle other servers.

In some embodiments, the rack manager may throttle one or more servers by a pre-defined throttling limit. The throttling limit may be a percentage of the processor specification processing capacity of the server, which may approximately correlate to a power consumption of the server. For example, the throttling limit may be a defined percentage. In some embodiments, the throttling limit may be less than 25% to allow the server to continue to perform computing functions while reducing the server consumption.

In some embodiments, a rack of servers configured with a first processing specification may have a combined maximum power consumption that is equal to or less than the maximum power supply of a single power feed. Under some circumstances, it may be desirable for one or more servers on the rack to be reconfigured to have an increased processing specification. Reconfiguring servers in this way may result in a combined maximum power consumption that is greater than the maximum supplied power of a single power feed. As discussed above, the power consumption of servers in a conventional rack may be limited so that it does not exceed the maximum supplied power of a single power feed. However, the techniques disclosed herein enable the servers in a rack to be reconfigured so that the servers' maximum power consumption can exceed the maximum supplied power of a single power feed. Therefore, instead of having individualized racks for different processing specifications, a single rack design can be utilized for different specifications and the servers in the rack can be reconfigured as needed.

As noted above, if a failure of one of the power feeds occurs, then the combined power consumption of the servers in the rack may exceed the maximum supplied power of the remaining power feed. This may cause the circuit breaker to begin a trip cycle, which if unmitigated, may end in power from the remaining power feed being cut off. To mitigate this high power usage, the rack manager may shut off one or more servers in the rack and/or throttle one or more servers in the rack. This may help to reduce the combined power consumption from the servers in the rack to below an operating threshold or limit of the circuit breaker. In turn, this may help to prevent the circuit breaker from tripping, or from completing the trip cycle. In this manner, the overall performance of the rack can be improved because of the potential for increased utilization of the servers when both power feeds are connected, while the reliability of the rack can be improved by reducing the chance of the rack losing power in the event of a power failure.

FIG. 1 illustrates a rack 100 according to at least one embodiment of the present disclosure. A plurality of servers 102 are installed in the rack 100. The rack 100 receives power from a first power feed 104-1 and a second power feed 104-2. Each server 102 may be connected to both the first power feed 104-1 and the second power feed 104-2. In the event of a failure in the power being supplied by either the first power feed 104-1 or the second power feed 104-2, the servers 102 in the rack 100 may still receive power from the remaining power feed 104.

The rack 100 may include a rack manager 106 that is in communication with the first power feed 104-1, the second power feed 104-2, and the servers 102. In the embodiment shown, the rack manager 106 is depicted as being located at the location where the power feeds 104 plug into the rack 100. However, it should be understood that the rack manager 106 may be located anywhere on the rack 100. In some embodiments, the rack manager 106 may be located at a power management distribution unit (PMDU). The power feeds 104 may be plugged into the PMDU, and the servers 102 may receive power from the power feeds 104 through the PMDU.

The rack 100 may include one or more circuit breakers 108. The circuit breaker(s) 108 may be connected to the power feeds 104 to disconnect the power between the rack 100 and the power feeds 104 should the power consumption of the servers exceed an operational threshold of the circuit breaker 108. In some embodiments, both the first power feed 104-1 and the second power feed 104-2 may have different circuit breakers 108.

Under some circumstances, the power being supplied by the first power feed 104-1 or the second power feed 104-2 may be interrupted. As discussed above, the servers 102 may be independently connected to the first power feed 104-1 and the second power feed 104-2. Thus, if the first power feed 104-1 fails, the servers 102 may continue to operate with power from the second power feed 104-2 (or vice versa). While the examples presented herein may describe the first power feed 104-1 as losing power and the second power feed 104-2 retaining power, it should be understood that any example provided herein may include the second power feed 104-2 losing power and the first power feed 104-1 retaining power.

Because of the power mitigation techniques disclosed herein, the combined power consumption of the servers 102 may exceed the maximum supplied power of a single power feed. Therefore, the servers 102 may have a combined power consumption that exceeds the operational threshold of the circuit breaker 108, and the circuit breaker 108 may begin a trip cycle. The trip cycle may take a period of time. During the trip cycle, the rack manager 106 may identify that the combined power consumption of the servers has exceeded the operational threshold of the circuit breaker 108. To reduce the combined power consumption, the rack manager 106 may place a power cap on one or more of the servers 102. In other words, the rack manager 106 may reduce the number of operations that a server 102 may perform, which may reduce its power consumption. In some embodiments, to reduce the combined power consumption, the rack manager 106 may disconnect (e.g., shut down, turn off) power to one or more of the servers 102, thereby reducing the combined power consumption of the servers 102. The rack manager 106 may reduce the combined power consumption low enough to stop the circuit breaker from tripping.

Figure 2:
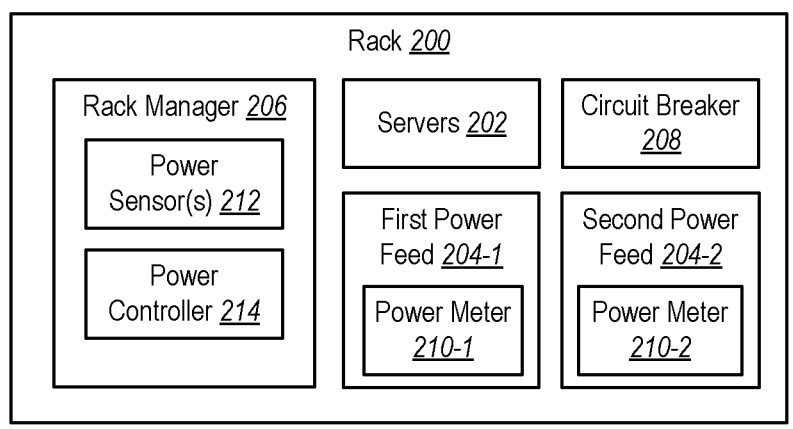
FIG. 2 is a block diagram that includes various components that can be included in a rack.

FIG. 2 is a block diagram illustrating various components that can be included in a rack 200 in accordance with the present disclosure. The rack 200 includes a plurality of servers 202. The rack 200 is powered by a first power feed 204-1 and a second power feed 204-2. The rack 200 includes one or more circuit breakers 208 to protect the rack 200 from damage due to the servers 202 pulling more power than one or both of the power feeds (collectively 204) can handle.

In some embodiments, the rack 200 includes a rack manager 206. The rack manager 206 may be in communication with the other elements of the rack 200. For example, the rack manager 206 may include one or more power sensors 212. The power sensors 212 may measure the amount of power being drawn through the first power feed 204-1 and the second power feed 204-2. In some embodiments, each power feed 204 may have its own power sensor 212. The rack 200 can include one or more power sensors 212 that are configured to measure power at the servers 202. For example, the rack 200 can include a plurality of power sensors 212, and each power sensor 212 can be configured to measure the individual power drawn by a particular server 202. The combined power usage by the servers 202 in the rack 200 can be determined by adding the power usage of each individual server 202.

In some embodiments, the rack manager 206 may include a power controller 214. The power controller 214 may monitor the power levels at the power feeds 204. For example, the power controller 214 may monitor the power levels measured using the power sensor 212. In some embodiments, the power controller 214 may control the connection of the power feeds 204 to the rack 200. For example, the rack manager 206 may monitor the measured power levels of the servers 202 and/or the power drawn through the power feeds 204. If the power levels exceed an operational threshold of the power feeds 204, then the power controller 214 may reduce the total power consumption of the servers 202 by throttling or shutting down one or more of the servers 202.

The rack manager 206 can be configured to monitor the circuit breaker 208. If the circuit breaker 208 begins a trip cycle to disconnect power between one or both power feeds 204 and the rack 200, then the power controller 214 may reduce the total power consumption of the servers 202 by throttling or shutting down one or more of the servers 202.

In some embodiments, the rack manager 206 and/or the power controller 214 may monitor and/or track any other portion of the rack 200 to determine whether to reduce the power consumption of one or more servers 202. For example, the power controller 214 may monitor temperature levels, cooling system capacity, power levels, utilization rates of the servers 202, any other system element, and combinations thereof.

Figure 3:
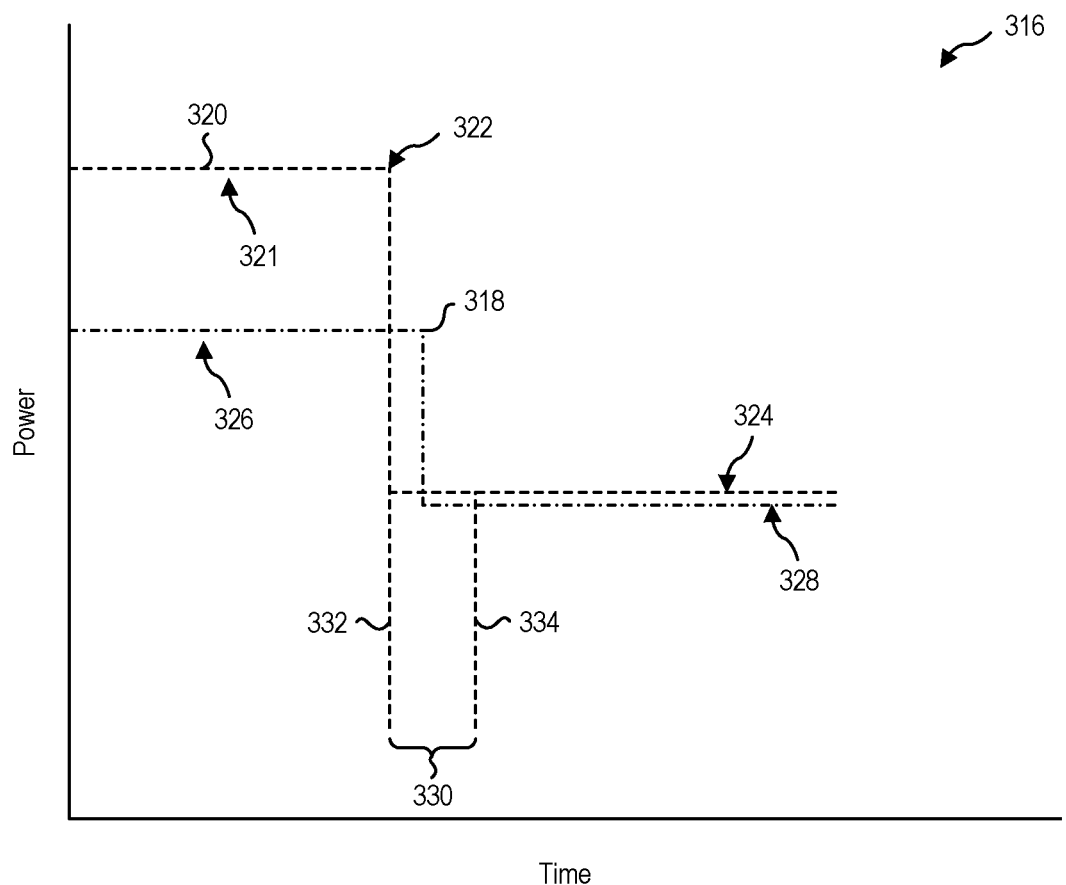
FIG. 3 is a representation of a power diagram of the supplied power to a rack supporting a plurality of servers and the power consumption of the rack.

FIG. 3 is a representation of a power diagram 316 of the supplied power and the power consumption of a rack 200 supporting a plurality of servers 202 with time represented on the horizontal axis and power represented on the vertical axis, according to at least one embodiment of the present disclosure. The power diagram 316 shown includes a server power line 318 that represents combined power consumption of a plurality of servers 202. The power diagram 316 further includes a combined power feed line 320 that represents the combined maximum power supplied by a first power feed 204-1 and a second power feed 204-2 into the rack 200.

The power feed line 320 shown is representative of both the first power feed 204-1 and the second power feed 204-2 supplying power to the rack 200 in a dual-feed region 321 until a power failover event 322. At the power failover event 322, the first power feed 204-1 stops supplying power to the rack 200 and the second power feed 204-2 assumes the entirety of the power being supplied to the rack 200. Thus, the power feed line 320 illustrates a reduction in the maximum supplied power in a single-feed region 324, which is a result of only the second power feed 204-2 supplying power to the rack 200.

As may be seen at the server power line 318, when both power feeds are supplying power to the rack 200, the combined server power is unmitigated in an unmitigated server power zone 326. The maximum combined power consumption of the servers 202 shown is higher than the power supplied from a single power feed, as seen in a comparison of the server power in the unmitigated server power zone 326 of the server power line 318 and the single-feed region 324 of the power feed line 320.

After the power failover event 322, the unmitigated server power consumption exceeds the available power supplied by the second power feed 204-2. The rack manager 206 may be monitoring the combined server power consumption and the available power supplied by the power feeds. When the rack manager 206 identifies that the combined server power consumption exceeds the available power, the rack manager 206 may begin reducing the combined server power consumption. The rack manager 206 may reduce the combined server power consumption to a mitigated server power consumption level, as shown by the mitigated power consumption zone 328 of the server power line 318. In some embodiments, the mitigated server power consumption may be the same as or lower than the single feed supplied power. This may help to prevent a circuit breaker 208 from tripping and interrupting power between the second power feed 204-2 and the rack 200.

In some embodiments, when the server power consumption exceeds the available power by the second power feed 204-2 (such as may occur at the power failover event 322), a circuit breaker 208 in the rack 200 may begin to trip to cut power from the second power feed 204-2 to the rack 200. In some embodiments, tripping the circuit breaker 208 may not occur instantaneously. For example, tripping of the circuit breaker 208 may occur over a trip cycle period 330, which extends from trip cycle start 332 when the circuit breaker 208 first senses that the combined server power consumption has exceeded its threshold until a trip cycle end 334, when the circuit breaker 208 completes the trip cycle and interrupts power between the second power feed 204-2 and the rack 200.

The rack manager 206 may mitigate the overdraft of power after a power failover event before the trip cycle end 334. In other words, the rack manager 206 may reduce the power consumption of the servers 202 during the trip cycle period 330, or between the trip cycle start 332 and the trip cycle end 334. In some embodiments, as may be seen by the illustrated server power line 318, reducing the power consumption of the servers 202 may be delayed after the power failover event 322. Alternatively, reducing the power consumption of the servers 202 may occur immediately after the power failover event 322. Reducing the power consumption of the servers 202 may occur over a period of time, the period of time caused by the time the rack manager 206 takes to identify the overdraft of power, select a mitigation policy (e.g., which servers 202 to power cap and/or shut off), and execute the mitigation policy.

In some embodiments, the rack manager 206 may know the trip cycle period 330. The rack manager 206 may provide instructions to selected servers 202 to save critical data in permanent memory and/or shut down. Before cutting power to the selected server(s) 202, the rack manager 206 may provide the selected server(s) 202 time to save data and/or shut down. If the selected server(s) 202 do not shut down within the allocated time, then the rack manager 206 may interrupt the power connection with the server(s) 202 anyway to prevent the circuit breaker 208 from tripping. Regardless of the time it takes for the rack manager 206 to reduce the server power consumption, the server power consumption may be reduced in time for the circuit breaker 208 not to complete the trip cycle.

Figure 4:
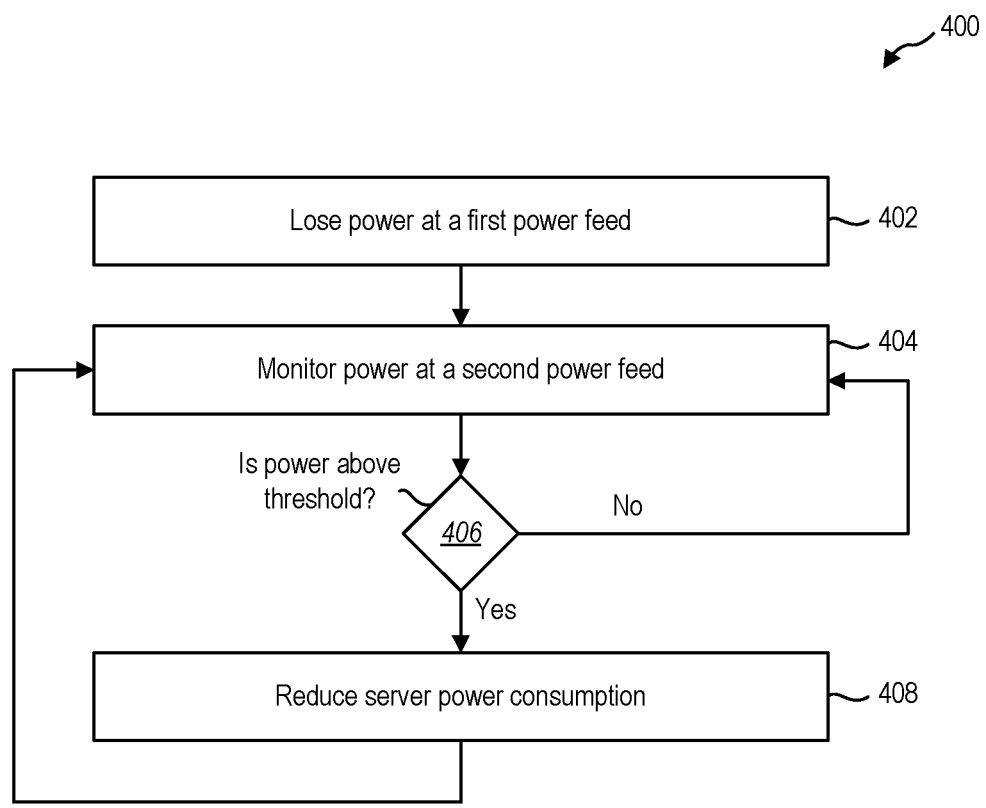
FIG. 4 is a flow diagram that illustrates a method for mitigating a power failover.

FIG. 4 is a flow diagram that illustrates a method 400 for mitigating power overdraft during a loss of power from a power feed that powers a rack of servers, according to at least one embodiment of the present disclosure. The method 400 may be performed by one or more components in the rack 200 shown in FIG. 2. For example, the acts of the method 400 may be performed by the rack manager 206 in conjunction with the other elements of the rack 200 of FIG. 2.

According to the method 400, the rack 200 of servers 202 includes a first power feed 204-1 and a second power feed 204-2 that individually and collectively provide power for the servers 202 in the rack 200. The method 400 may include losing 402 power at the first power feed 204-1. Losing 402 the power may occur through many different types of events, including planned outages and unplanned outages. In some embodiments, the rack manager 206 may identify the power outage. For example, the rack manager 206 may have a first power meter 210-1 at the first power feed 204-1 (as well as a second power meter 210-2 at the second power feed 204-2), and the rack manager 206 may identify, via the power meter 210-1 that the first power feed 204-1 is no longer suppling power to the rack 200. In some embodiments, the rack manager 206 may have another sensor 212 that determines whether the first power feed 204-1 is supplying power to the rack 200. In some embodiments, the rack manager 206 may be in communication with an external device that provides information regarding the status of the first power feed 204-1.

In some embodiments, the method 400 may include monitoring 404 the power drawn at the second power feed 204-2. The rack manager 206 may monitor 404 the power drawn using any mechanism for monitoring power, including a second power meter 210-2 at the second power feed 204-2 or another sensor 212 measuring power at the second power feed 204-2 or at the servers 202. While monitoring 404 the power drawn at the second power feed 204-2, the rack manager 206 may determine 406 whether the power is above an operating threshold or limit. In some embodiments, the operating threshold may be based on the maximum supplied power from the second power feed 204-2. In some embodiments, the operating threshold may be the same as the maximum supplied power. In some embodiments, the operating threshold may be reduced by a defined percentage of the maximum supplied power. In some embodiments, the operating threshold may be determined based on a continuous use threshold for the circuit breaker 208. If the combined server power consumption exceeds the continuous threshold, the circuit breaker 208 may begin a trip cycle, which, if completed, may cause the power to be disconnected between the second power feed 204-2 and the rack 200.

If the rack manager 206 determines 406 that the combined server power consumption is not greater than the operating threshold, then the rack manager 206 continues to monitor 404 the combined server power consumption. However, if the rack manager 206 determines 406 that the combined server power consumption is greater than the operating threshold, then the rack manager 206 may reduce 408 the combined server power consumption. Reducing 408 the combined server power consumption may include one or both of throttling one or more servers 202 or cutting power to the one or more servers 202.

After reducing 408 the combined server power consumption, the rack manager 206 may continue to monitor 404 the power consumption at the second power feed 204-2. For instance, the rack manager 206 may reduce 408 the combined server power consumption, and then monitor 404 the combined server power consumption to determine 406 again whether the power consumption is above the operating threshold. Thus, the method 400 may be at least partially iterative, or the method 400 may loop through monitoring 404, determining 406, and reducing 408 the combined server power consumption.

In some embodiments, the rack manager 206 may reduce 408 the maximum combined server power consumption to below the operating threshold as soon as the power failover event occurs. In other words, as soon as power to the first power feed 204-1 is lost 402, the rack manager 206 may determine 406 that the maximum combined power consumption of the servers 202 is greater than the threshold. In this manner, the combined server power may not ever exceed the operating threshold when the rack 200 is powered by a single power feed.

Alternatively, in other embodiments the rack manager 206 may only reduce 408 the combined power consumption after the combined power consumption exceeds the operating threshold. Thus, even after losing 402 power from the first power feed 204-1, the server may operate without having any power reduced or servers 202 shut off. The rack manager 206 may monitor 404 power consumption levels of the servers 202, and only reduce 408 the combined power consumption after the actual measured power usage of the servers 202 exceeds the operating threshold.

The rack manager 206 may reduce 408 the combined power consumption after the combined power consumption of the servers 202 exceeds the operating threshold for a period of time. This may help to prevent unnecessary throttling and/or shutting down of servers 202 due to instantaneous or short-period spikes in power consumption. In some embodiments, the period of time may be less than a trip cycle period (e.g., trip cycle period 330 of FIG. 3) to allow the rack manager 206 to reduce the combined power consumption before the circuit breaker 208 trips.

Figure 5:
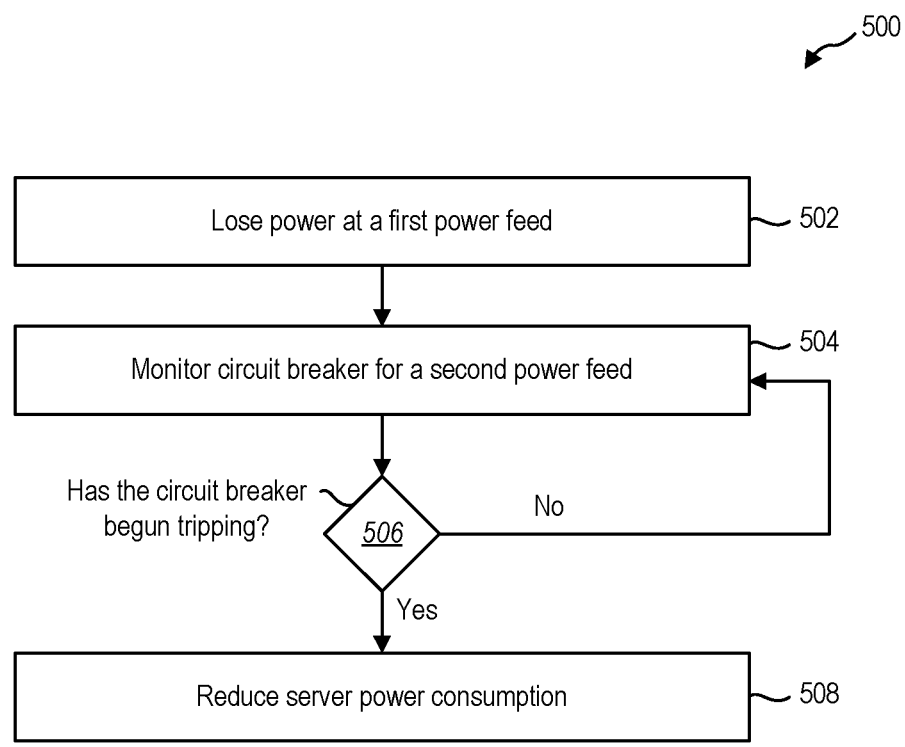
FIG. 5 is a flow diagram that illustrates another method for mitigating a power failover.

FIG. 5 is a flow diagram that illustrates another method 500 for mitigating power overdraft during a loss of power from a power feed that powers a rack 200 of servers 202, according to at least one embodiment of the present disclosure. The method 500 may be performed by one or more components in the rack 200 shown in FIG. 2. For example, the acts of the method 500 may be performed by the rack manager 206 in conjunction with the other elements of the rack 200 of FIG. 2.

According to the method 500, the rack 200 of servers 202 includes a first power feed 204-1 and a second power feed 204-2 that individually and collectively provide power to the servers 202 in the rack 200. The method 500 may include losing 502 power at the first power feed 204-1. Losing 502 the power may occur through many different types of events, including planned outages and unplanned outages. The rack manager 206 may determine that a power outage has occurred. For example, the rack manager 206 may have a power meter 210-1 at the first power feed 204-1, and the rack manager 206 may identify, via the power meter 210-1, that the first power feed 204-1 is no longer supplying power to the rack 200. In some embodiments, the rack manager 206 may have another sensor 212 that determines whether the first power feed 204-1 is supplying power to the rack 200. In other embodiments, the rack manager 206 may be in communication with an external device that provides information regarding the status of the first power feed 204-1.

When the power has been lost to the first power feed 204-1, the rack manager 206 may monitor 504 the circuit breaker 208 for the second power feed 204-2. For example, the rack manager 206 may monitor 504 elements of the circuit breaker 208 for activity that indicates that the circuit breaker 208 has begun a trip cycle. The rack manager 206 may determine 506 whether the circuit breaker 208 has begun a trip cycle. If the rack manager 206 determines 506 that the circuit breaker 208 has not begun a trip cycle, the rack manager 206 may continue to monitor 504 the circuit breaker 208. If the rack manager 206 determines 506 that the circuit breaker 208 has begun a trip cycle, then the rack manager 206 may reduce 508 the power consumption of one or more servers 202. For example, the rack manager 206 may throttle one or more servers 202 and/or shut off one or more servers 202 to reduce the power consumption.

In some embodiments, the rack manager 206 may iteratively reduce the power consumption. For instance, the rack manager 206 may throttle one or more servers 202, and check to see if the circuit breaker 208 is still performing the trip cycle. If the circuit breaker 208 is still performing the trip cycle, then the rack manager 206 may reduce power again by throttling more extensively, throttling additional servers 202, and/or shutting down servers 202.

Figure 6:
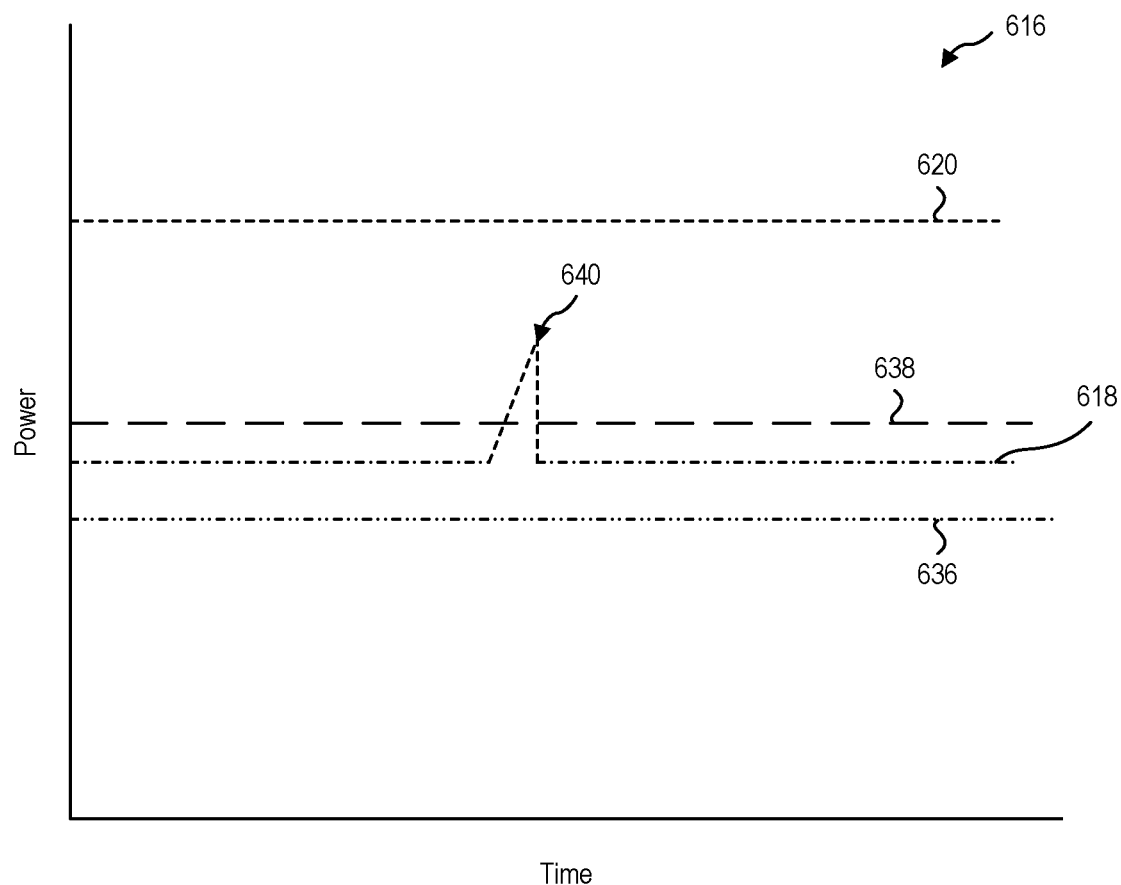
FIG. 6 is a representation of a power diagram of the supplied power to a rack supporting a plurality of servers and the power consumption of the rack.

FIG. 6 is a representation of a power diagram 616 of the supplied power and power consumption of a rack 200 supporting a plurality of servers 202 with time represented on the horizontal axis and power represented on the vertical axis, according to at least one embodiment of the present disclosure. The power diagram 616 shown includes a server power line 618 that represents combined power consumption of a plurality of servers 202. The power diagram 616 further includes a dual-feed power line 620 that represents the combined maximum power supplied by a first power feed 204-1 and a second power feed 204-2 into the rack 200.

In the power diagram 616, a single-feed power line 636 represents the maximum available power from a single power feed into the server. However, in the embodiment shown in FIG. 6, the power available to the system is represented by the dual-feed power line 620, and the single-feed power line 636 is provided for reference. As may be seen in a comparison between the server power line 618 and the single-feed power line 636, the rack 200 operates with a combined server power that is greater than the maximum available power from a single feed into the rack 200.

In the embodiment shown, a dual-feed threshold 638 represents a threshold of maximum combined server power consumption when both the first power feed 204-1 and the second power feed 204-2 are supplying power to the rack 200. In some embodiments, the rack 200 may experience a power spike 640, where the combined power consumption of the servers 202 increases above the dual-feed threshold 638, represented by the server power line 618 crossing over the dual-feed threshold. The rack manager 206 may be monitoring the combined power consumption of the servers 202 (e.g., monitoring the server power line 618). At the power spike 640, the rack manager 206 may determine that the combined power consumption is greater than the dual-feed threshold, and may reduce the combined power consumption of the servers 202 to below the dual-feed threshold by throttling and/or shutting down one or more servers 202.

In some embodiments, keeping the combined power consumption below the dual-feed threshold may prevent the circuit breaker 208 from tripping in the event of a power failover. For example, the circuit breaker 208 may have an instantaneous threshold and a continuous-use threshold that is de-rated from the instantaneous threshold. If the combined power consumption through the circuit breaker 208 exceeds the instantaneous threshold, then the circuit breaker 208 may trip quickly or instantaneously (e.g., too fast for the rack manager 206 to mitigate or reduce the combined power consumption before the circuit breaker 208 completes a trip cycle). In some embodiments, the dual-feed power threshold may be set at the instantaneous threshold. In this manner, during a power failover event, the combined power consumption will be below the instantaneous threshold, thereby preventing the circuit breaker 208 from tripping immediately after the power failover. In other embodiments, the dual-feed power threshold may be set between the instantaneous threshold and the continuous threshold to further prevent the circuit breaker 208 from tripping during a power failover.

Figure 7:
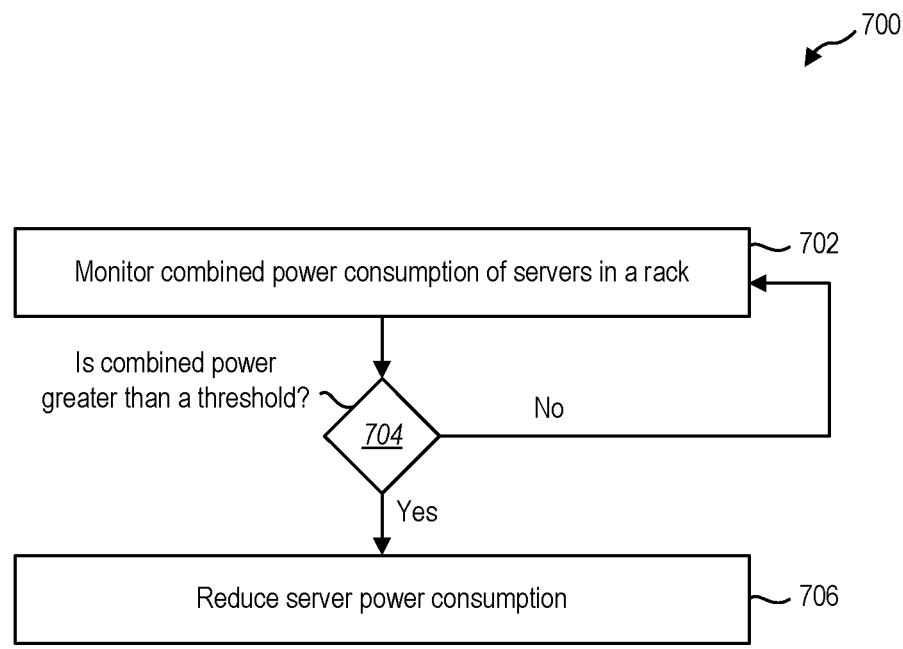
FIG. 7 is a flow diagram that illustrates another method for mitigating a power failover.

FIG. 7 is a flow diagram that illustrates a method 700 for mitigating power overdraft during a loss of power from a power feed that powers a rack 200 of servers 202, according to at least one embodiment of the present disclosure. The method 700 may be performed by one or more components in the rack 200 shown in FIG. 2. For example, the acts of the method 700 may be performed by the rack manager 206 in conjunction with the other elements of the rack 200 of FIG. 2.

According to the method 700, a rack manager 206 may monitor 702 a combined power consumption of the servers 202 installed on a rack 200. The rack manager 206 may monitor 702 the power consumption in many different ways, including using a sensor 212, monitoring the utilization of the servers 202, and/or analyzing temperature data. The rack manager 206 may determine 704 whether the combined power consumption is greater than a power threshold. If the combined power consumption is not greater than the power threshold, then the rack manager 206 may continue to monitor 702 the combined power consumption. If the combined power consumption is greater than the power threshold, then the rack manager 206 may reduce 706 the combined power consumption of the servers 202, such as by throttling and/or shutting off one or more servers 202.

Figure 8:
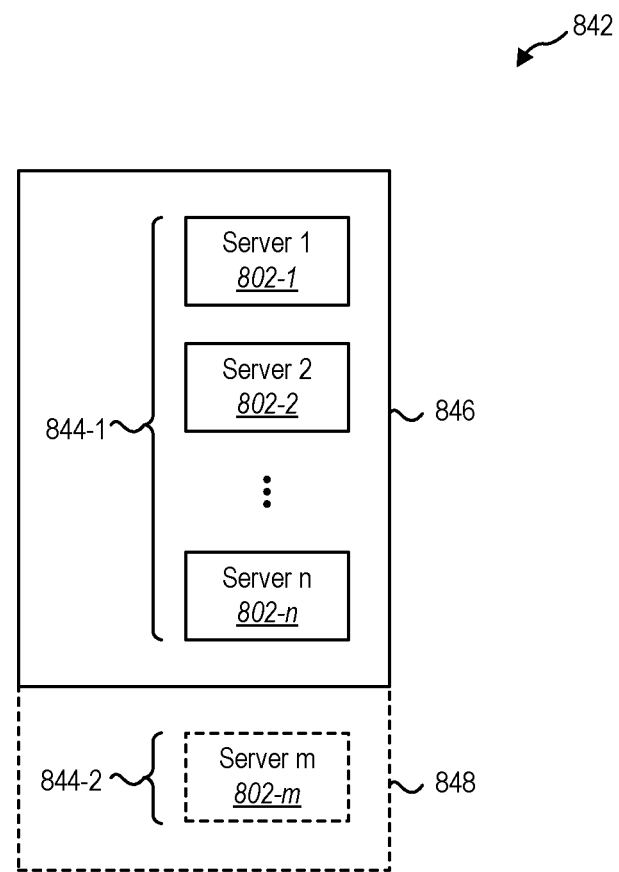
FIG. 8 is a representation of the power distribution among servers in a rack.

FIG. 8 is a representation of a server set 842 installed in a rack, according to at least one embodiment of the present disclosure. The server set 842 may include a first subset of servers 844-1. The first subset of servers 844-1 may include one or more servers, including a first server 802-1, a second server 802-2, and so forth until server n 802-*n*. The server set 842 may further include a second subset of servers 844-2, which may include one or more servers, including server m 802-*m*.

When both a first power feed and a second power feed supply power to the server set 842, then the first subset of servers 844-1 and the second subset of servers 844-2 may be powered. The power box 846 is representative of the power supplied by a single power feed to the rack, and the power box 848 is representative of the power supplied by two combined power feeds to the rack. As may be seen the first subset of servers 844-1 are encompassed by the power box 846. Thus, if power from one of the power feeds were lost, then the first subset of servers 844-1 would continue to receive power. However, because the second subset of servers 844-2 is not inside the power box 846, it is only powered when both power feeds supply power to the rack. Thus, in the embodiment shown, in the event of a power failover, the second subset of servers 844-2 may be automatically throttled or shut down.

In some embodiments, a network engineer or administrator may pre-identify one or more servers (e.g., the server m 802-*m* in the second subset of servers 844-2) to throttle and/or shut down in the event of a power failover. For example, a network engineer or administrator may identify a server that is performing low-criticality functions, underperforming, can easily off-load processing tasks, or is otherwise identified as available to reduce the combined power consumption of the rack. If the rack manager determines that the combined power consumption exceeds a pre-determined threshold, then the rack manager may simply throttle shutdown the pre-identified server. This may help reduce the amount of processing the rack manager performs while reducing the combined power consumption, which may speed up the mitigation. This may help to reduce the chance of the circuit breaker tripping.

In some embodiments, the network engineer or administrator may identify multiple servers as available for power reduction. In some embodiments, the network engineer or administrator may identify a mitigation policy. The mitigation policy may identify a series of steps that may be taken when reducing the power consumption of the servers. For example, the mitigation policy may identify a first step of throttling server m 802-*m*. If that is insufficient to reduce the combined power consumption below the threshold, the mitigation policy may identify a second step of shutting off server m 802-*m*. If that is insufficient to reduce the combined power consumption to below the threshold, the mitigation policy may identify additional servers to throttle and/or shut down in a sequence until the combined power consumption is below the threshold.

Figure 9:
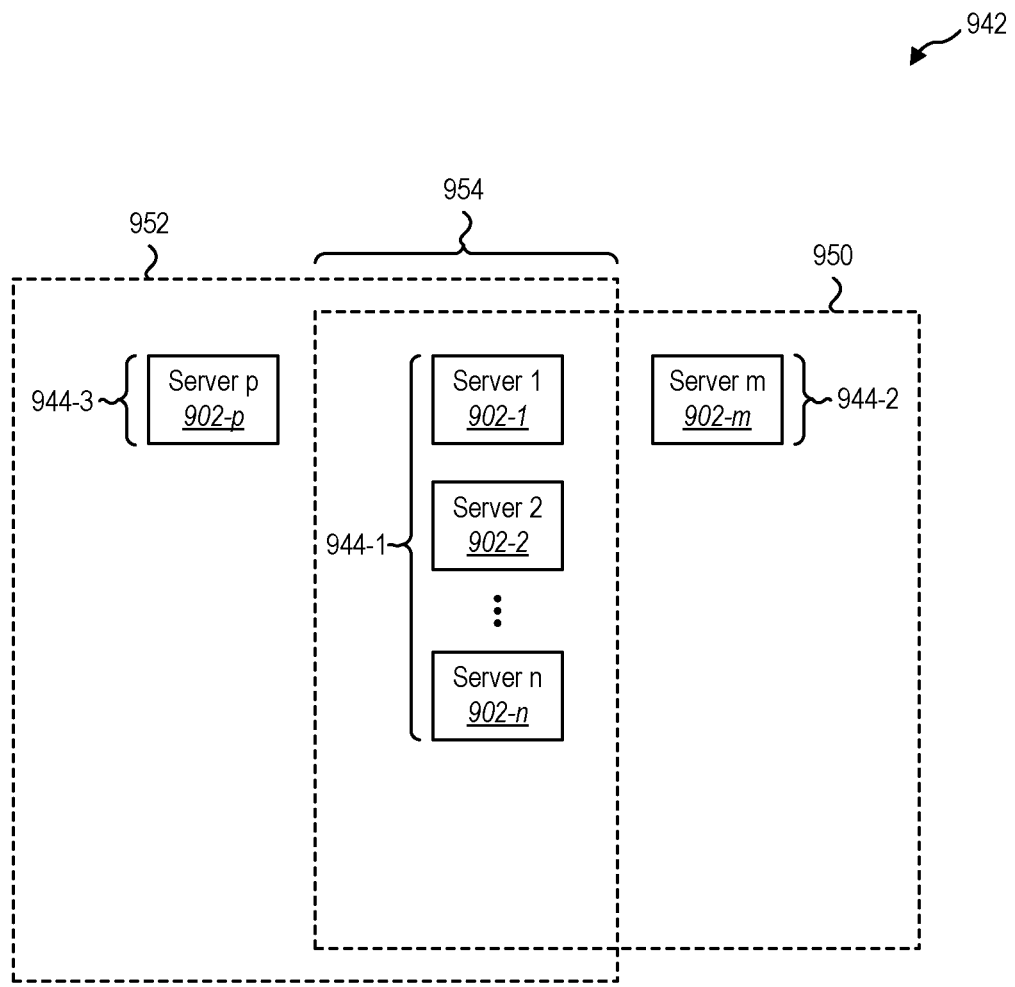
FIG. 9 is a representation of the power distribution among servers in another rack.

FIG. 9 is a representation of a server set 942 installed in a rack, according to at least one embodiment of the present disclosure. The server set 942 may include a first subset of servers 944-1. The first subset of servers 944-1 may include one or more servers, including a first server 902-1, a second server 902-2, and so forth until server n 902-*n*. The server set 942 may further include a second subset of servers 944-2, which may include one or more servers, including server m 902-*m*. The server set 942 may still further include a third subset of servers 944-3, which may include one or more servers, including server p 902-*p*.

The first power box 950 is representative of the power supplied to the rack by a first power feed and the second power box 952 is representative of the power supplied to the rack by a second power feed. The servers 902 enclosed by the boxes provide an indication of which power box provides power to which server 902. The first power box 950 and the second power box 952 overlap in a dual-feed zone 954.

As may be seen in FIG. 9, the first subset of servers 944-1 is located in the dual-feed zone 954 (e.g., the first subset of servers 944-1 is located in the first power box 950 and the second power box 952). This indicates that each of the servers in the first subset of servers 944-1 may receive power from one or both of the first power feed or the second power feed. However, the second subset of servers 944-2 is only located inside the first power box 950. This indicates that the servers in the second subset of servers 944-2 may receive power only from the first power feed. The third subset of servers 944-3 is only located inside the second power box 952. This indicates that the servers in the third subset of servers 944-3 may receive power only from the second power feed.

If the supplied power from the first power feed 204-1 were lost, then the second power feed would supply all the power to the rack. Because the second subset of servers 944-2 does not receive power from the second power feed, the second subset of servers 944-2 will automatically have their power interrupted and shut down when power from the first power feed is lost.

If the supplied power from the second power feed were lost, then the first power feed would supply all the power to the rack. Because the third set of servers 944-3 does not receive power from the first power feed, the third set of servers 944-2 will automatically have their power interrupted and shut down when power from the second power feed is lost.

By assigning specific servers to receive power only from either the first power feed or the second power feed, a network administrator or engineer may make mitigation of power failover events automatic, without the need for analysis by a rack manager. This may help to prevent tripping a circuit breaker after a power failover event. In some embodiments, the servers assigned to receive power from only the first power feed or the second power feed may not have a power connection to the other feed. For example, server m 902-*m* may only have a physical power cable plugged into the first power feed and server p 902-*p* may only have a physical power cable plugged into the second power feed. In this manner, no software or other analysis is necessary for reducing the combined power consumption of the servers.

In some embodiments, the servers assigned to receive power from only the first power feed or the second power feed may have the power connection to their respective feeds interrupted by the rack manager. In other words, the rack manager may control the connection of the server m 902-*m* to the first power feed but not the second power feed and the connection of the server p 902-*p* to the second power feed but not the first power feed. This may increase the versatility of a rack of servers by reducing or eliminating any changing of physical connections between the servers if the rack (or any servers within the rack) are repurposed.

Figure 10:
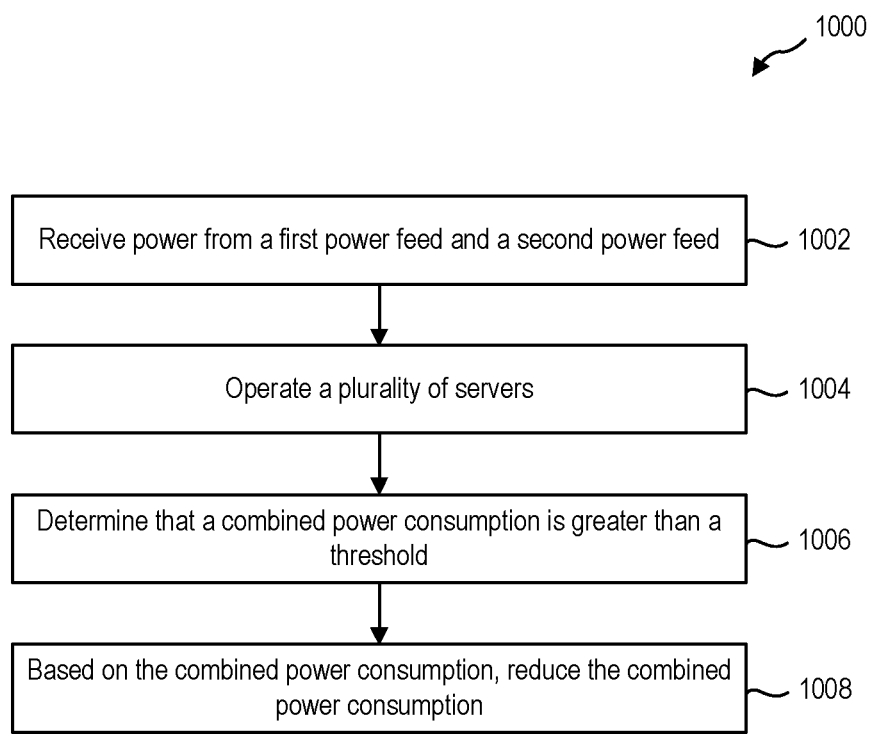
FIG. 10 is a flow diagram that illustrates another method for mitigating a power failover.

FIG. 10 is a flow diagram that illustrates a method 1000 for mitigating power overdraft during a loss of power from a power feed that powers a rack 200 of servers 202, according to at least one embodiment of the present disclosure. The method 1000 may be performed by one or more components in the rack 200 shown in FIG. 2. For example, the acts of the method 1000 may be performed by the rack manager 206 in conjunction with the other elements of the rack 200 of FIG. 2.

The method 1000 may include receiving 1002 power from a first power feed 204-1 and a second power feed 204-2 at the rack 200. The first power feed 204-1 has a first maximum supplied power and the second power feed 204-2 has a second maximum supplied power. A plurality of servers 202 is operated 1004 in the rack 200. The plurality of servers 202 has a maximum combined power consumption that is greater than at least one of the first maximum supplied power or the second maximum supplied power.

The method 1000 may further include determining 1006 that a combined power consumption of the plurality of servers 202 is greater than a threshold. Based on the combined power consumption (e.g., based on the determination 1006 that the combined power consumption is greater than the threshold), the combined power consumption of the plurality of servers 202 may be reduced 1008 to below the threshold.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

Systems and methods according to the present disclosure may be performed using any of the technological systems described herein. Furthermore, embodiments of the present disclosure may be implemented using computing technology, hardware and software, not currently available, or which may become available in the future.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method implemented by a rack manager on a server rack, the method comprising:
    monitoring a first power feed and a second power feed, the first power feed and the second power feed providing power to a plurality of servers on the server rack, wherein at least one server of the plurality of servers is powered by both the first power feed and the second power feed, and wherein a power consumption of the plurality of servers exceeds at least one of a maximum supplied power of the first power feed and a maximum supplied power of the second power feed;
    detecting that the first power feed has lost power and is not providing power to the plurality of servers on the server rack; and
    causing, based on the first power feed not providing power to the plurality of servers, the plurality of servers to reduce power consumption before completion of a power trip cycle.

2. The method of claim 1, wherein causing the plurality of servers to reduce power consumption includes reducing a combined power consumption of the plurality of servers to below a maximum supplied power of the second power feed.

3. The method of claim 1, further comprising:
    implementing a first processing specification on a first set of one or more servers of the plurality of servers, wherein the first processing specification, when applied to each server of the plurality of servers, does not cause the plurality of servers to exceed a maximum supplied power of an individual power feed of the plurality of power feeds; and
    implementing a second processing specification on a second set of one or more servers of the plurality of servers, wherein the second processing specification, when applied to each server of the plurality of servers, causes the plurality of servers to exceed a maximum supplied power of an individual power feed of the plurality of power feeds.

4. The method of claim 3, wherein causing the plurality of servers to reduce power consumption includes causing the second set of one or more servers to reduce power consumption based on the second set of servers having the second processing specification implemented thereon.

5. The method of claim 4, wherein causing the second set of one or more servers to reduce power consumption is performed while allowing the first set of one or more servers to remain at a current level of power consumption based on the first set of one or more servers having the first processing specification implemented thereon.

6. The method of claim 1, wherein causing the plurality of servers to reduce power consumption includes reducing a combined power consumption of the plurality of servers to below a safety margin of the second power feed until the first power feed again supplies power to the server rack.

7. The method of claim 1, wherein causing the plurality of servers to reduce power consumption includes one or more of:
  placing a power cap on at least one server of the plurality of servers; and
  disconnecting at least one server of the plurality of servers.

8. The method of claim 1, wherein causing the plurality of servers to reduce power consumption includes:
  initiating shut off of at least one server of the plurality of servers;
  determining that the at least one server is still in a process of shutting off when the power trip cycle is set to expire; and
  extending the power trip cycle until the at least one server shuts off.

9. The method of claim 1, wherein causing the plurality of servers to reduce power consumption includes:
  identifying a plurality of functions corresponding to the plurality of servers; and
  shutting off at least one server of the plurality of servers identified to be performing a low-criticality function.

10. The method of claim 1, further comprising initiating the power trip cycle based on detecting that the first power feed is not providing power to the plurality of servers on the server rack.

11. A server rack, including:
  a plurality of servers being coupled to a plurality of power feeds, the plurality of power feeds including a first power feed and a second power feed; and
  a rack manager device in communication with the plurality of servers, the rack manager device including a processor being executable to:
    monitor the first power feed and the second power feed, the first power feed and the second power feed providing power to the plurality of servers on the server rack, wherein at least one server of the plurality of servers is powered by both the first power feed and the second power feed, and wherein a power consumption of the plurality of servers exceeds at least one of a maximum supplied power of the first power feed and a maximum supplied power of the second power feed;
    detect that the first power feed has lost power and is not providing power to the plurality of servers on the server rack; and
    cause, based on the first power feed not providing power to the plurality of servers, the plurality of servers to reduce power consumption before completion of a power trip cycle.

12. The server rack of claim 11, wherein causing the plurality of servers to reduce power consumption includes reducing a combined power consumption of the plurality of servers to below a maximum supplied power of the second power feed.

13. The server rack of claim 11, wherein the processor on the rack manager is further executable to:
  implement a first processing specification on a first set of one or more servers of the plurality of servers, wherein the first processing specification, when applied to each server of the plurality of servers, does not cause the plurality of servers to exceed a maximum supplied power of an individual power feed of the plurality of power feeds; and
  implement a second processing specification on a second set of one or more servers of the plurality of servers, wherein the second processing specification, when applied to each server of the plurality of servers, causes the plurality of servers to exceed a maximum supplied power of an individual power feed of the plurality of power feeds.

14. The server rack of claim 13, wherein causing the plurality of servers to reduce power consumption includes causing the second set of one or more servers to reduce power consumption based on the second set of one or more servers having the second processing specification implemented thereon while allowing the first set of one or more servers to remain at a current level of power consumption based on the first set of servers having the first processing specification implemented thereon.

15. The server rack of claim 11, wherein causing the plurality of servers to reduce power consumption includes reducing a combined power consumption of the plurality of servers to below a safety margin of the second power feed until the first power feed again supplies power to the server rack.

16. A method implemented by a rack manager on a server rack, the method comprising:
  monitoring a first power feed and a second power feed, the first power feed and the second power feed providing power to a plurality of servers on the server rack, wherein at least one server of the plurality of servers is powered by both the first power feed and the second power feed, and wherein a power consumption of the plurality of servers exceeds at least one of a maximum supplied power of the first power feed and a maximum supplied power of the second power feed;
  detecting that the first power feed has lost power and is not providing power to the plurality of servers on the server rack;
  determining that a combined power consumption of the plurality of servers exceeds an operating threshold associated with operation of the server rack when powered by a single power feed; and
  causing, based on the first power feed not providing power to the plurality of servers and determining that the combined power consumption exceeds the operating threshold, the plurality of servers to reduce power consumption before completion of a power trip cycle.

17. The method of claim 16, wherein the operating threshold is a continuous use threshold.

18. The method of claim 17, further comprising initiating the power trip cycle based on the combined power consumption exceeding the continuous use threshold.

19. The method of claim 16, further comprising:
  implementing a first processing specification on a first set of one or more servers of the plurality of servers, wherein the first processing specification, when applied to each server of the plurality of servers, does not cause the plurality of servers to exceed a maximum supplied power of an individual power feed of the plurality of power feeds; and
  implementing a second processing specification on a second set of one or more servers of the plurality of servers, wherein the second processing specification, when applied to each server of the plurality of servers, causes the plurality of servers to exceed a maximum supplied power of an individual power feed of the plurality of power feeds.

20. The method of claim 19, wherein causing the plurality of servers to reduce power consumption includes causing the second set of one or more servers to reduce power consumption based on the second set of one or more servers having the second processing specification implemented thereon while allowing the first set of one or more servers to remain at a current level of power consumption based on the first set of one or more servers having the first processing specification implemented thereon.

* * * * *